(12) United States Patent
Hu et al.

(10) Patent No.: US 9,973,514 B2
(45) Date of Patent: May 15, 2018

(54) METHOD AND APPARATUS FOR ASSURING LOCATION DATA INTEGRITY WITH MINIMUM LOCATION DISCLOSURE

(71) Applicant: Hong Kong Baptist University, Kowloon (HK)

(72) Inventors: Haibo Hu, Kowloon Tong (HK); Qian Chen, Kowloon Tong (HK); Jianliang Xu, Kowloon Tong (HK)

(73) Assignee: Hong Kong Baptist University, Hong Kong (HK)

( * ) Notice: Subject to any disclaimer, the term of this patent is extended or adjusted under 35 U.S.C. 154(b) by 143 days.

(21) Appl. No.: 14/874,620

(22) Filed: Oct. 26, 2015

(65) Prior Publication Data
US 2017/0012996 A1 Jan. 12, 2017

Related U.S. Application Data

(60) Provisional application No. 62/069,287, filed on Oct. 27, 2014.

(51) Int. Cl.
| | |
|---|---|
| *G06F 21/00* | (2013.01) |
| *H04L 9/36* | (2006.01) |
| *H04L 9/32* | (2006.01) |
| *H04L 29/06* | (2006.01) |
| *G06F 21/62* | (2013.01) |
| *H04L 9/06* | (2006.01) |

(52) U.S. Cl.
CPC ........ *H04L 63/123* (2013.01); *G06F 21/6245* (2013.01); *H04L 9/3242* (2013.01); *G06F 2221/2111* (2013.01)

(58) Field of Classification Search
CPC ... H04L 63/123; H04L 9/0841; H04L 9/3242; G06F 21/6245; G06F 2221/2111
See application file for complete search history.

(56) References Cited

U.S. PATENT DOCUMENTS

| | | | |
|---|---|---|---|
| 2007/0091927 A1* | 4/2007 | Apostolopoulos | ......................... H04L 29/06027 370/473 |
| 2014/0108789 A1* | 4/2014 | Phatak | .................... G06F 21/34 713/156 |

FOREIGN PATENT DOCUMENTS

WO    WO 2010020910 A2 *   2/2010   ........... H04L 9/0631

OTHER PUBLICATIONS

Chuting Tan, Zoe L. Jiang, Xuan Wang, S.M. Yiu, Junbin Fang, Jin Li, Yabin Jin, Jiajun Huang; "Generic Construction of Publicly Verifiable Predicate Encryption"; May 2016; ASIA CCS '16: Proceedings of the 11th ACM on Asia Conference on Computer and Communications Security; Publisher: ACM; pp. 889-894.*

\* cited by examiner

*Primary Examiner* — Mohammad W Reza
*Assistant Examiner* — Courtney Fields
(74) *Attorney, Agent, or Firm* — Idea Intellectual Limited; Margaret A. Burke; Sam T. Yip

(57) ABSTRACT

An invention relates to method and apparatus of a location assurance system and particularly, although not exclusively, the present invention also relates to method and apparatus for assuring location data integrity with minimum location disclosure. The present invention also relates to method and apparatus for assuring location data integrity with minimum location disclosure with protocols to authenticate both spatial and spatio-temporal predicates.

18 Claims, 9 Drawing Sheets

(a) Client CPU Time (b) Verifier CPU Time

METHOD AND APPARATUS FOR ASSURING LOCATION DATA INTEGRITY WITH MINIMUM LOCATION DISCLOSURE

BACKGROUND OF INVENTION

The present invention relates to method and apparatus of a location assurance system and particularly, although not exclusively, the present invention also relates to method and apparatus for assuring location data integrity with minimum location disclosure. The present invention also relates to method and apparatus for assuring location data integrity with minimum location disclosure with protocols to authenticate both spatial and spatio-temporal predicates.

Since the boom of smartphones and location-based services, spatio-temporal data (i.e., user locations with timestamps) have become an essential input in many real-life applications. To ensure to these applications that the data are genuine from the underlying location tracking hardware and not altered by any malicious party (including the user himself/herself), the integrity of location data has to be authenticated by schemes such as digital signature or message authentication code (MAC). However, these conventional schemes disclose to the verifier the complete plaintext location and thus completely expose the user location and jeopardize his/her privacy. Thus, there is a need for an integrity assurance scheme with minimum location disclosure.

SUMMARY OF INVENTION

An embodiment of the present invention provides a method and apparatus of a location assurance system and particularly, although not exclusively, the present invention also relates to method and apparatus for assuring location data integrity with minimum location disclosure. The present invention also relates to method and apparatus for assuring location data integrity with minimum location disclosure with protocols to authenticate both spatial and spatio-temporal predicates.

In a first aspect of the present invention there is presented a method for assuring location data integrity with minimum location disclosure comprising steps of
- using Prefix-verifiable Message Authentication Codes (PMAC) to assure the integrity of the location data between at least one authenticator and at least one verifier;
- using the PMAC from the previous step to authenticate/verify for spatial and spatio-temporal predicates; and
- using one or more message authentication codes indexes and one or more optimization techniques to reduce computation and communication costs.

In a first embodiment of the first aspect of the present invention there is presented a method wherein the PMAC is generated via steps comprising
- generating a symmetric key and securely sharing this symmetric key between the at least one authenticator and the at least one verifier;
- generating a random value of r;
- generating a PMAC value of string x at timestamp t with respect to the symmetric key generated in the first step; and
- storing at least one tuple of (r, PMAC(x, t)) together with string x and timestamp t on at least one client for authentication/verification.

In a second embodiment of the first aspect of the present invention there is presented a method wherein the PMAC is authenticated/verified via steps comprising
- for any given prefix pre(x), at least one client obtains at least one suffix su(x), computes $\sigma = g^{\Pi(su(x))r} \mod p$, and sends the results together with t and PMAC(x,t) to the at least one verifier;
- the at least one verifier computes $$(\sigma^{\Pi(pre(x))} g^{\psi_k(t)})^\alpha = g^{\alpha(\Pi(x)r + \psi_k(t))} \mod p,$$

and compares the computed results with the received PMAC(x,t) to verify the given prefix pre(x).

In a third embodiment of the first aspect of the present invention there is presented a method wherein the authenticate for spatial predicates are done via steps comprising
- authenticating/verifying a containment of spatial predicate of q on x in the same manner as to verifying given prefix pre(x) according to claim 3 in each dimension using PMAC.

In a fourth embodiment of the first aspect of the present invention there is presented a method wherein the containment of spatial predicate of q on x are implemented via a hierarchical grid scheme wherein the grid scheme imposes limitations comprising
- on the containment of spatial predicate of q in one or more dimensions, the beginning and ending positions of q, denoted by q.l and q.u wherein each must share the same prefix and have the same number of '0's and '1''s in their suffix, respectively.

In a fifth embodiment of the first aspect of the present invention there is presented a method wherein the hierarchical grid scheme is an overlayed grid system wherein q.l and q.u are encoded in different grids.

In a sixth embodiment of the first aspect of the present invention there is presented a method wherein for a given containment of spatial predicate of q and a set of grids, the encoding and authentication q in each dimension is done via operation steps comprising
- for each trie of a grid, first locate q.l;
- then traverse upward until the label on the edge is no longer '0' or the label on the edge is no longer the first character in the alphabet then the corresponding subtree is q'.l, and it is valid if the length is no shorter than that of q;
- similarly, the same operation steps are done to find q'.u for the same trie.

In a seventh embodiment of the first aspect of the present invention there is presented a method wherein the authentication/verification for spatial-temporal predicates are done via steps comprising
- for a given a spatio-temporal predicate (q, T), a client first locates timestamps t[s], ..., t[e] in T that fall in time interval T;
- for each location x[i] (s≤i≤e), said client sends pre(x[i]), $\Pi(su(x[i]))$, t[i] and P M AC(x[i], t[i]) to the at least one verifier to compute and compare two versions of PMAC(x[i], t[i]);
- if the two versions of P M AC(x[i], t[i]) are the same, x[i] is inside q.

In an eighth embodiment of the first aspect of the present invention there is presented a method wherein Aggregated PMAC is used in place of PMAC.

In a ninth embodiment of the first aspect of the present invention there is presented a method wherein PMAC Search Tree is used as one of the indexing technique to reduce computation and communication costs.

In a tenth embodiment of the first aspect of the present invention there is presented a method wherein PMAC Clustered Search Tree is used as one of the indexing technique to reduce computation and communication costs.

In an eleventh embodiment of the first aspect of the present invention there is presented a method wherein density-based spatial recoding is used as one of the optimization technique to reduce computation and communication costs.

In a twelfth embodiment of the first aspect of the present invention there is presented a method wherein accelerate PMAC verification is used as one of the optimization technique to reduce computation and communication costs.

In a second aspect of the present invention there is presented an apparatus implementing the first aspect of the present invention wherein there are modules implementing operations comprising
  at least one module using Prefix-verifiable Message Authentication Codes (PMAC) to assure the integrity of the location data between at least one authenticator and at least one verifier;
  at least one module using the PMAC from the previous step to authenticate/verify for spatial and spatio-temporal predicates; and
  at least one module using one or more message authentication codes indexes and one or more optimization techniques to reduce computation and communication costs.

In a first embodiment of the second aspect of the present invention there is presented an apparatus wherein the PMAC is generated via steps comprising
  generating a symmetric key and securely sharing this symmetric key between the at least one authenticator and the at least one verifier;
  generating a random value of r;
  generating a PMAC value of string x at timestamp t with respect to the symmetric key generated in the first step; and
  storing at least one tuple of (r, PMAC(x, t)) together with string x and timestamp t on at least one client for authentication/verification.

In a second embodiment of the second aspect of the present invention there is presented an apparatus wherein the PMAC is authenticated/verified via steps comprising for any given prefix pre(x), at least one client obtains at least one suffix su(x), computes $\sigma = g^{\Pi(su(x))r} \bmod p$, and sends the results together with t and PMAC(x,t) to the at least one verifier;
  the at least one verifier computes $$(\sigma^{\Pi(pre(x))} g^{\psi_k(t)})^\alpha = g^{\alpha(\Pi(x)r + \psi_k(t))} \bmod p,$$

and compares the computed results with the received PMAC(x,t) to verify the given prefix pre(x).

In a third embodiment of the second aspect of the present invention there is presented an apparatus wherein the authenticate for spatial predicates are done via steps comprising
  authenticating/verifying a containment of spatial predicate of q on x in the same manner as to verifying given prefix pre(x) according to claim 16 in each dimension using PMAC.

In a fourth embodiment of the second aspect of the present invention there is presented an apparatus wherein the containment of spatial predicate of q on x are implemented via a hierarchical grid scheme wherein the grid scheme imposes limitations comprising on the containment of spatial predicate of q in one or more dimensions, the beginning and ending positions of q, denoted by q.l and q.u wherein each must share the same prefix and have the same number of '0's and '1''s in their suffix, respectively.

In a fifth embodiment of the second aspect of the present invention there is presented an apparatus wherein the hierarchical grid scheme is an overlayed grid system wherein q.l and q.u are encoded in different grids.

In a sixth embodiment of the second aspect of the present invention there is presented an apparatus wherein Aggregated PMAC is used in place of PMAC and/or PMAC Search Tree and/or PMAC Clustered Search Tree is used as one or more of the indexing techniques and/or density-based spatial recoding and/or accelerate PMAC verification is used as one or more of the optimization techniques.

Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

Other definitions for selected terms used herein may be found within the detailed description of the invention and apply throughout. Unless otherwise defined, all other technical terms used herein have the same meaning as commonly understood to one of ordinary skill in the art to which the invention belongs.

Other aspects and advantages of the invention will be apparent to those skilled in the art from a review of the ensuing description.

BRIEF DESCRIPTION OF DRAWINGS

The above and other objects and features of the present invention will become apparent from the following description of the invention, when taken in conjunction with the accompanying drawings, in which.

DETAILED DESCRIPTION OF INVENTION

Figure 1:
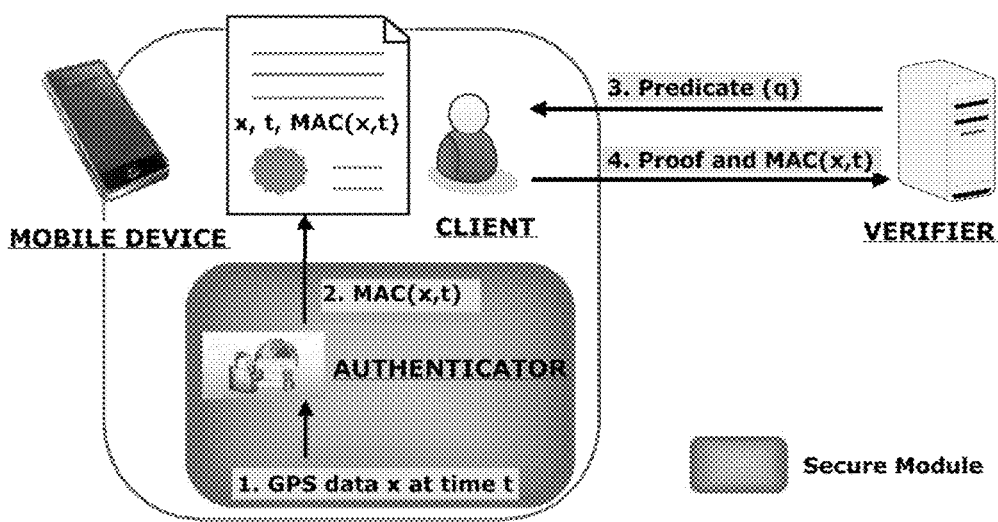
FIG. 1 shows the System Model.

The present invention is not to be limited in scope by any of the specific embodiments described herein. The following embodiments are presented for exemplification only.

Without wishing to be bound by theory, the inventors have discovered through their trials, experimentations and research that to accomplish the task of assuring location data integrity with minimum location disclosure with protocols to authenticate both spatial and spatio-temporal predicates.

Location-based services (LBS) have become increasingly popular in recent years, thanks to the intensive penetration of GPS-enabled smartphones and tablet computers. As more businesses and public services go mobile, spatio-temporal data (i.e., user locations with timestamps) become an essential input for many real-life applications. However, while location privacy has been under the spotlight in LBS research, there has been very little study on the growing necessity for location integrity. In many applications, the service provider must be assured of the genuineness of a mobile user's input location with respect to some spatio-temporal predicate, such as "being in a specific region during a given time period". The following just lists some of these applications:

Location auditing: The location of a subject needs to be continuously checked over time against some regulation. For example, a car rental requires the customer not to drive away from its service area for insurance coverage; a worker is supposed to stay in the factory area during working hours; and law enforcement requires a person with flight risk not to leave an area for a period of time.

Location-based access control: Some businesses or services (e.g., casinos, insurance companies, or immigrations) need to verify the user's geographic location before authorizing access or providing services.

Location testimony: The claimed location of a subject needs to be verified. For example, a security guard or a maintenance technician needs to show that he has patrolled his assigned area; a suspect needs to provide an alibi that he was not in the crime scene when the offence was committed.

A naive method of authenticating a user location against a predicate is to disclose to the verifier the complete plaintext location, together with a proof (a digital signature or a message authentication code) generated by a trusted party (also known as the "authenticator") who has access to the genuine data. Unfortunately, this completely exposes the user location and hence jeopardizes his/her privacy, while all the verifier needs to authenticate is whether he/she is in a specific region. In this invention, the problem of spatio-temporal integrity assurance that incurs minimum location disclosure is researched. Specifically, the disclosed granularity of the location is just precise enough to prove the spatio-temporal predicate is true, and the verifier learns nothing beyond this. Further, to assure integrity of the same location for a wide range of (future) applications, the solution should not know the predicate a priori. That is, a single proof can authenticate the integrity against any upcoming predicates with variable sizes and positions.

In cryptography, there are two mechanisms of integrity proof for a message string to a verifier, namely, digital signatures and message authentication codes (MAC). While digital signatures are based on asymmetric keys, MACs use symmetric keys—the authenticator and the verifier share the same key. As such, MAC is generally more efficient than digital signature scheme.

In this invention, the MAC was adopted as the scheme for integrity assurance, and the major challenges are two-fold: (1) how to convert the problem of spatio-temporal authentication to integrity proof of message strings; and (2) how to assure string integrity without disclosing the strings. For the former, the invention proposed to encode locations and regions into strings and thus a spatio-temporal predicate becomes a prefix-matching predicate, i.e., location string x has region string q as its prefix. For the latter, a new MAC called Prefix-verifiable Message Authentication Code (PMAC) was designed. It has two unique properties: (1) it can prove a query string q is a prefix of a message string x, without disclosing x; (2) a single PMAC can be used to authenticate against any query string q.

Based on PMAC, the present invention proposes an authentication scheme for spatial predicates and then extends it to spatio-temporal predicates. To speed up the verification process of the latter, two PMAC indexes were designed, namely, the PS-tree and PS*-tree, which aggregate individual values for block verification. Two optimization techniques, one based on computational simplification and the other on space recoding, are also proposed to further improve the computation and communication costs. To summarize, the inventive contributions made in this invention are as follows:

To the best of present general background knowledge, this is the first work that addresses spatio-temporal integrity assurance with privacy protection. The problem is critical for both location-based service industry and database research community.

A prefix-verifiable message authentication code is designed, based on which authentication schemes for spatial and spatio-temporal predicates were developed.

Two PMAC indexes and two optimization techniques that reduce the computation and communication costs were designed.

A rigorous security analysis and extensive experiments was conducted, which show the proposed schemes are both efficient and robust under various system settings.

Problem Definition

In one example embodiment of the present invention, the inventors through their own research, trials and experimentation, studied how a user authenticates his/her location to a third-party service against a spatial or spatio-temporal predicate while exposing the minimum location information. A user location is a 3-ary (a, b, t), where a, b are the user's longitude and latitude, and t is the location timestamp. Without loss of generality, it is assume all coordinates and timestamps are integers, as they have finite precision in reality. A spatial predicate returns true or false about a user location against a spatial geometry. In this example, it is focused on the containment predicate, i.e., whether the user location is inside a window. Note that if the window has a temporal dimension, this predicate becomes a spatio-temporal one. Minimum location disclosure means that the user agrees to disclose to the verifier the predicate result, i.e., whether he/she is in the window or not; however, the verifier cannot learn anything about the user location beyond this result.

With reference to FIG. 1, there is illustrated a block diagram of a system model being implemented to provide an embodiment of a method for assuring location data integrity with minimum location disclosure comprising steps of:

using Prefix-verifiable Message Authentication Codes (PMAC) to assure the integrity of the location data between at least one authenticator and at least one verifier;

using the PMAC from the previous step to authenticate/verify for spatial and spatio-temporal predicates; and using one or more message authentication codes indexes and one or more optimization techniques to reduce computation and communication costs.

The system may include three parties (shown in FIG. 1): (i) a location authenticator, (ii) a client (i.e., a prover), and (iii) a verifier. The client, typically a mobile app, needs to authenticate, on behalf of a user, his historical or current location to the verifier against some spatio-temporal predicates. The genuine location is provided by the location authenticator, a secure and trusted module in the mobile device. In practice, a location authenticator can be implemented in the OS kernel or GPS firmware, whose security can be assured by the OS checksum/signature or tamper-proof hardware, such as a secure co-processor. Similar to the sender role in message authentication, the authenticator cannot guarantee that the client does not modify the genuine location during the above authentication process, or even worse, the authenticator may not be available then. As such, the present invention adopts the same two-phase paradigm as in message authentication. Specifically, in the (offline) production phase (steps 1 and 2 in FIG. 1), the authenticator accesses the genuine user location at timestamp t, encodes it to a string x, produces a message authentication code MAC(x, t), and stores the tuple of (x, t, MAC(x, t)) outside the secure module. In the (online) verification phase, the verifier challenges the client with a predicate (in terms of string q), while the latter authenticates the result of whether q is a prefix of x with MAC(x, t), timestamp t, and some additional proof.

As for the security model, the present invention follows the conventional assumption in integrity assurance that the authenticator owns a secret key for the MAC production, to which the verifier has access while the client does not. This can be implemented, for example, through a trusted key authority where the authenticator deposits its key for authorized verifiers. Note that each verifier needs to retrieve this key only once. In the verification protocol, the present invention assumes that both the client and the verifier follow a semi-honest model. As such, the security threat of this system is twofold:

Location integrity. The client may attempt to alter the predicate result by generating a fake location $x' \neq x$ and forging a MAC value for x'.

Location privacy. The verifier may attempt to learn more information about the client's location than what is implied by the result.

There are two remarks regarding the problem definition. First, the present invention only need to study privacy protection on individual predicates, because the verifier cannot gain any additional information by issuing a series of predicates, as they must be prefixes of the location string and are thus spatially non-overlapping to each other. Second, while the present invention focuses on window containment predicates, the solution can be extended to containment predicates of irregular shapes or other predicates defined in the Dimensionally Extended nine-Intersection Model (DE-9IM), as long as the shapes can be encoded into strings and the predicates into prefix-matching predicates as shown herein in the present invention.

In the following sections, an example of the present invention will be described to start with the designing of the integrity proofs created in the production phase and then presenting the client-verifier protocols to verify spatio-temporal predicates based on these proofs. The preferred idea to designing the proof is to encode the space by an alphabet and convert a containment predicate in space to a prefix matching predicate on strings. In the next section, the present example shows how the latter can be verified without disclosing the complete string to the verifier. In a further section, the present example shows how the space is encoded and the conversion is made.

Prefix-Verifiable Message Authentication Code (PMAC)

In one example, the challenge of designing a prefix-verifiable MAC is that q has an arbitrary length and is unknown to the authenticator in advance. As such, this MAC scheme is also preferred to be variable-length verifiable so that a single MAC value can be used to authenticate the integrity of any prefix of x. In what follows, the present invention first introduces HMAC, a standard MAC scheme, followed by the properties required for the proposed PMAC. Finally, the present invention presents the PMAC scheme.

Preliminary: HMAC

Keyed-hash message authentication code (HMAC) is an international standard of message authentication code with a secret cryptographic key. Given a key k and message x, the output of HMAC is defined as:

$$\text{HMAC}(k,x) = h((k \oplus \text{opad}) \| h(k \oplus \text{ipad}) \| x).$$

where h is a cryptographic hash function, opad and ipad are two constants, each with length n, a single block of the input to h.

Properties of PMAC

The PMAC of string x must satisfy the following properties. First, while the prefix of x, denoted by pre(x), should be presented to the verifier as a plaintext, to protect the suffix of x from the verifier, denoted by su(x), this part must be presented in an irreversible manner. As such, the PMAC should be in the following form.

PMAC(x)=PMAC(pre(x), T(su(x))), where T is a one-way transformation.

Second, to be prefix- and variable-length verifiable, the PMAC must satisfy the property that for any two prefix of x, pre(x) and pre'(x), the PMAC values are the same. Formally, $$\text{PMAC}(\text{pre}(x), T(su(x))) = \text{PMAC}(\text{pre}'(x), T(su'(x))).$$

Third, to prevent the client from forging the same MAC of x with a different string, the PMAC scheme must be collision free. That is, it is hard for the client to find a collision string $x' \neq x$ such that $$\text{PMAC}(\text{pre}(x), T(su(x))) = \text{PMAC}(\text{pre}(x'), T(su(x'))).$$

Unfortunately, HMAC and all existing MAC schemes may not satisfy the first property, where the suffix of x needs to be sent to the verifier as plaintext. To satisfy all properties above, a naive idea is to hash each character of the string and concatenate them in the same order:

$$\text{PMAC}(x) = h[h(x_1) | h(x_2) | \ldots | h(x_m)],$$

where $x_i$ is the character in the i-th position of string x. Suppose a prefix has length $|\text{pre}(x)|=d$, so the client has to send characters $x_1, x_2, \ldots x_d$ as well as hash values $h(x_{d+1}) | h(x_{d+2}) | \ldots | h(x_m)$ to the verifier. Obviously, the disadvantage of this scheme is that the total number of hash values to be received is m–d, and can be as many as m–1 (when d=1).

The Proposed PMAC

In what follows, the present invention presents the design of the proposed PMAC scheme.

Definition 3.1

Let g∈G be a generator of a multiplicative cyclic group G of order p where the Decisional Diffie-Hellman (DDH) assumption holds and g, p are public. Π(x) is a public hash function of string x that satisfy the following properties: multiplicative malleable, i.e., Π(x)=Π(pre(x))Π(su(x)), where pre(x) is a prefix of x and su(x) is the corresponding suffix; and (2) collision-resistant, that is, it is hard to find x'≠x such that Π(x)=Π(x').

Key Generation A symmetric key (α, k) is generated and securely shared between the authenticator and the verifier, where α∈$Z_p$, and k is the key for ψ( ), a keyed pseudorandom function.

PMAC Generation The authenticator generates a random r∈$Z_p$. The PMAC value of string x at timestamp t with respect to key (α, k) is defined as:

$$PMAC(x,t) = g^{\alpha(\Pi(x)r - \psi_k(t))} \mod p. \quad (1)$$

The tuple (r, PMAC(x, t)) together with string x and timestamp t are then stored on the client for future verification.

Verification It involves a protocol between the client and the verifier:

Given a prefix pre(x), the client obtains the suffix su(x), computes σ=$g^{\Pi(su(x))r}$ mod p, and sends it together with t and PMAC(x,t) to the verifier.

The verifier computes $$(\sigma^{\Pi(pre(x))} g^{\psi_k(t)})^\alpha = g^{\alpha(\Pi(x)r + \psi_k(t))} \mod p, \quad (2)$$

and compares it with the received PMAC(x,t)—if they are the same, pre(x) is the genuine and unmodified prefix of x.

The confidentiality of su(x) against the verifier is achieved by allowing the latter to receive only σ. According to the Decisional Diffie-Hellman assumption, the verifier is unable to learn Π(su(x))r (and thus su(x)). The random r further guarantees confidentiality even when the domain of valid su(x) is very small (i.e., the suffix contains very few characters). The present invention will formally prove this as well as the integrity of PMAC for any prefix of x in a further section.

As for implementation, a possible choice of Π(x) is as follows $$\prod(x) \equiv \prod_{i=1}^{m} \pi(x_i, i),$$

where Π($x_i$, i) maps $x_i$, the i-th character of x, to an independent prime number. For a string domain of length m and an alphabet of c characters, this implementation needs totally mc prime numbers.

Authenticating Spatial Predicate

Recall that a window containment spatial predicate q returns true if a user location x (without temporal dimension) is inside q. Throughout this specification, the present invention only considers the predicate whose result is "true", i.e., x is inside q. In this section, the present invention design a space encoding scheme to map x in each dimension into a string $U_{i=1}^m x_i$, and similarly q into another string $U_{i=1}^d q_i$ where $q_i$ is the i-th character of string q, and 1≤d≤m. As such, authenticating a containment predicate q on x is equivalent to authenticating that q is a prefix of x in each dimension, the latter of which can be verified using PMAC.

To achieve the above equivalency, the encoding scheme must satisfy the following two properties. First, it must be a space partition, i.e., any user location or window must have a unique string encoding. In essence, a user location is a window of the finest granule. Second, if window A encloses window B, then the encoded string of A must be a prefix of that of B in each dimension. This latter property essentially requires the encoding has a trie hierarchy, where each node corresponds to a prefix string.

Figure 2:
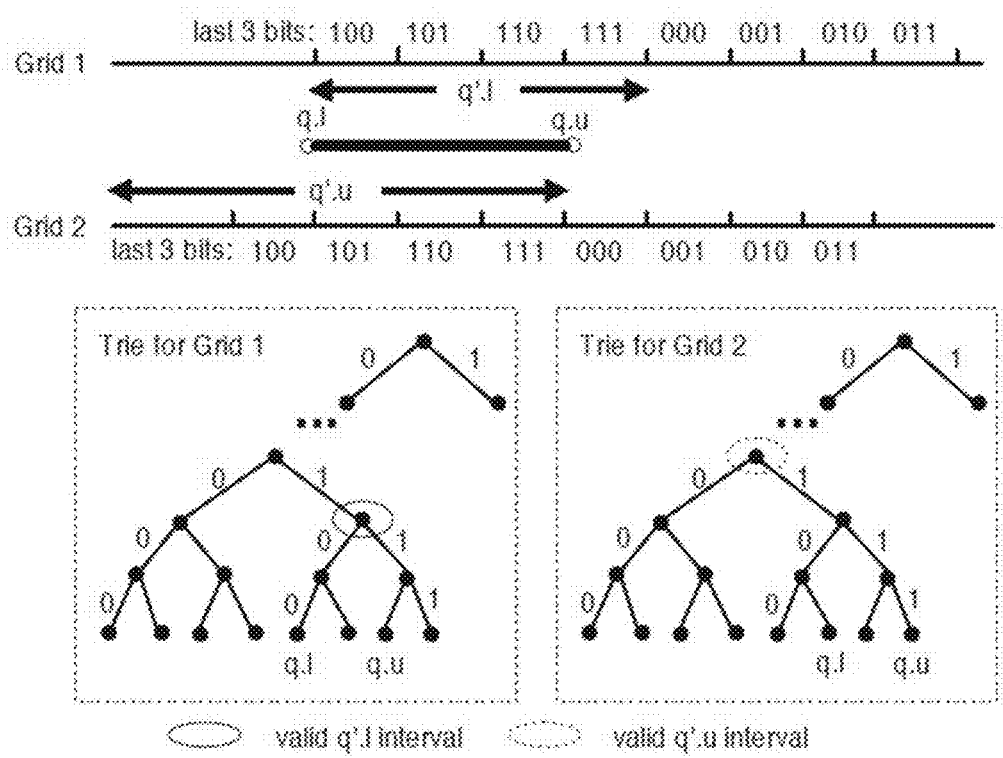
FIG. 2 shows the overlayed Grid System for Encoding q.

Given these requirements, the most natural encoding scheme is to adopt a hierarchical grid. Given an alphabet of size c and the longest string length m in each dimension, a grid system partitions this dimension into c uniform intervals and do it recursively for m times. An interval corresponds to a node in the trie, which has m levels and exactly c children for each node. A user location has the finest granule and corresponds to a leaf node whose interval length is c–m (assuming the entire length of this dimension is normalized to 1). FIG. 2 illustrates two possible grids and their tries where c=2. The encoded strings of a window q are simply the strings of nodes that correspond to q in each dimension.

The grid scheme imposes limitations on the window q—in each dimension, the beginning and ending positions of q, denoted by q.l and q.u, must share the same prefix and have the same number of '0's and '1''s in their suffix, respectively. There are two consequences. First, for any two windows q'≠q to authenticate either q fully contains q' or vice versa, and thus they are not overlapping. Second, any window q must have a length in a power of c of a leaf interval, i.e., $c^{-m/d}$, $c^{-m/d+1}$, . . . , $c^{-1}$, 1. To improve the flexibility of q, the present invention proposes an overlayed grid system. The key idea is to encode q.l and q.u in different grids. In FIG. 2, two grids deviate from each other by 1 leaf interval. In grid 1, q.l ends with 2 '0's, and if the present invention remove them, the resulted interval, denoted by q'.l, still begins at q.l. Similarly in grid 2, q.u ends with 3 '1's, and if the present invention remove them, the resulted interval, denoted by q'.u, still ends at q.u. Note that to minimize the client-side computational cost, the present invention removes all ending '0's and '1's in q.l and q.u, respectively. With both grids, q is encoded by a pair of strings (q'.l, q'.u). Authenticating that a user location x is inside q is equivalent to authenticating that q'.l is a prefix of x in grid 1, and q'.u is a prefix of x in grid 2. The overlayed grid scheme has only one requirement on window q—to protect su(x), the length of q'.l and q'.u must be no shorter than that of q. For example in FIG. 2, the length of q'.l, q'.u and q are 4, 8, and 3 leaf intervals, respectively.

In general, given a window q and a set of grids, the present invention encodes and authenticates q in each dimension as follows (see FIG. 2). For each trie of a grid, the present invention first locate q.l and then traverse upward until the label on the edge is no longer '0' (or the first character in the alphabet). The corresponding subtree is q'.l, and it is valid if the length is no shorter than that of q. Similarly, the present invention can find q'.u for this trie. The encoded string pair of q in this dimension are the longest valid q'.l and q'.u of all tries. The present invention then invoke the PMAC verification protocol on x and q'.l, and on x and q'.u in their respective grids. Note that if no valid q'.l or q'.u exists, q has to be prolonged in one or both directions until valid q'.l and q'.u exist. To ensure q is the least altered, this shift of new q.l or q.u must be the minimum. Algorithm 1 illustrates the complete procedure of spatial authentication in an overlayed grid system.

Algorithm I Privacy-Preserving Spatial
Authentication in Overlayed Grid System

Input:    q: the window for authentication
           x: the client-side user location
           PMAC(i,j): the PMAC value of the
           i-th dimension in the j-th trie
Output:   true after the authentication
           succeeds
Procedure:
1: for each dimension i do
2:   set q'.l and q'.u as null
3:   for each trie j do
4:     compute new q'.l and q'.u
5:     if the new q'.l or q'.u is longer than q and the existing
       q'.l or q'.u then
6:       update q'.l or q'.u and set j as its grid
7:   if q'.l or q'.u is null then
8:     shift q.l or q.u by minimum intervals to have valid
       q'.l or q'.u
9:   invoke PMAC verification protocol with x and q'.l in the
     grid of q'.l and dimension i
10: invoke PMAC verification protocol with x and q'.u in the
     grid of q'.u and dimension i
11: return true Optimal Grid System Overlay Obviously, having more grids in the overlayed system makes it more likely to authenticate q without prolonging it. However, this is at the cost of generating more PMAC values. As such, the final problem in this section is that given a cost budget, i.e., $\tau$ grids in addition to the first grid, a.k.a, the "master" grid, how they should be placed to minimize the average shift of q.l and q.u. In this subsection, an embodiment of the present invention shows that for c=2, a minimum average shift can be achieved by placing these grids $2, \ldots, 2\tau$ leaf intervals from the master grid.

Theorem 4.1:

Given uniform distribution of x, a minimum average shift of q.l or q.u can be achieved when additional grids are placed $2, \ldots, 2\tau$ leaf intervals from the master grid.

Proof:

One embodiment of the present invention proves this by mathematical induction. Let's assume this theorem hold for $\tau=k$, and then prove it also holds for $\tau=k+1$. The one embodiment of the present invention first sorts these k+1 grids in ascending order of their deviation from the master grid. Without loss of generality, the first k grids in an optimal solution for k+1 grids must be deviated by at most $2^k$ leaf intervals from the master grid. Since they themselves form an optimal placement for k grids, according to the assumption, they must be deviated $2, \ldots, 2^k$ leaf intervals from the master grid. So the remaining task is to find the optimal placement for the k+1-th grid.

The present embodiment then prove that if the deviation of this grid is between $2^{k+1}$ and $2^{k+2}-1$ (both inclusive) leaf intervals, it will reduce the same amount of average shift of q.l or q.u. In fact, this grid is selected only when q is longer than $2^k$ and the k+1-th least significant bit of q.l (resp. q.u) is 1 (resp. 0). By selecting this grid, the k+1-th bit of q.l (resp. q.u) is flipped to 0 (resp. 1), reducing the average shift by 2k+1 leaf intervals. On the other hand, the first k least significant bits of q.l (resp. q.u) will be randomly flipped by selecting this grid, and thus contributing 0 to the average shift of q.l or q.u.

Finally, the present invention shows that if the deviation of this k+1-th grid is larger than or equal to $2^{k+2}$ leaf intervals from the master grid, it will always reduce a smaller amount of average shift of q.l or q.u. The present invention proves this for deviation between $2^{k+2}$ and $2^{k+3}-1$ (both inclusive), and the proof follows for other values. This k+1-th grid is selected in two cases. In the first case, q is longer than $2^{k+1}$ and the k+1-th and k+2-th least significant bits of q.l (resp. q.u) are both 1 (resp. 0). By selecting this grid, the k+2-th bit of q.l (resp. q.u) is flipped to 0 (resp. 1), reducing the average shift by $2^{k+2}$ leaf intervals. In the second case, q is longer than 2k but shorter than $2^{k+1}$ and the k+1-th and k+2-th least significant bits of q.l (resp. q.u) are both 1 (resp. 0). However, in this case, the average shift is reduced by at most $2^{k+1}$ leaf intervals because q is shorter than $2^{k+1}$ (that is, flipping the k+2-th bit is not necessary). As such, the reduction of average shift of q.l or q.u is smaller than $$\frac{1}{4}2^{k+2}P(q \geq 2^{k+1}) + \frac{1}{4}2^{k+1}P(2^k < q < 2^{k+1}) < \frac{1}{4}2^{k+1}P(q > 2^k),$$

where P ( ) denotes the probability of q, and obviously $$P(q \geq 2^{k+1}) + \frac{1}{2}P(2^k < q < 2^{k+1}) < P(q > 2^k).$$

$$P(q2k+1) + 1P(2k < q < 2k+1) < P(q > 2k).$$

Security Analysis

The present invention analyzes the security of spatial predicate authentication. Specifically, the present invention proves it achieves both aspects of its security model: location confidentiality against the verifier, and location integrity against the client. Further, it suffices to prove them for the PMAC verification protocol only since it is the only interaction between the client and verifier during authentication.

Location Confidentiality Against Verifier:

Equivalently, the present invention proves the suffix su(x) of an encoded location string x is secret to the verifier. Recall that in PMAC, $g \in G$ is a generator of a multiplicative cyclic group G of order p. First, one embodiment of the present invention shows that $g^r$ does not disclose any information about g.

Lemma 4.2:

For any random $r \leftarrow [0, |G|)$, $g^r$ has equal probability of being any element in G. Formally, for any $\hat{g} \in G$ $$Pr[g^r = \hat{g}] = 1/|G|.$$

Proof:

Let $\log_g$ ( ) denote the discrete logarithm of base g in group G.

$$Pr[g^r = \hat{g}] = Pr[r = \log_g(\hat{g})].$$

Since r is random, the probability of r being a fixed element $\log_g (\hat{g})$ equals to $1/|G|$.

As the verifier can only observe $g^{\Pi(su(x))r}$, the present invention proves the verifier learns nothing about su(x) from it.

Theorem 4.3:

The $g^{\Pi(su(x))}$ is indistinguishable under chosen plaintext attacks.

Proof:

Since $g^{\Pi(su(x))r} = (g^{\Pi(su(x))})^r$, and according to the above lemma, $g^{\Pi(su(x))}$ has equal probability of being any element in G. As such, the verifier learns nothing about $\Pi(su(x))$ and thus su(x). Further, since r is random for each x, $g^{\Pi(su(x))r}$ is indistinguishable under chosen plaintext attacks.

Location Integrity Against Client:

The present invention proves it is impossible for the client to forge a valid PMAC(x,t). The following proof is in two steps: (1) it is hard for the client to forge any $g^{\Pi(x)r}$ and PMAC(x,t) that satisfy Eqn. 2; (2) given $g^{\Pi(x)r}$ and q as the predicate, it is hard for the client to forge u such that $\sigma^{\Pi(pre(q))}=g^{\Pi(x)r}$. Recall that in the PMAC scheme, p and g are public, and ($\alpha$, k) is the symmetric key of the verifier.

Proof of Unforgeability of $g^{\Pi(x)r}$ and PMAC(x,t)

For ease of presentation, let $m=g^{\Pi(x)r}$, then:

$$PMAC(x,t)=(m \cdot g^{\psi k(t)})^\alpha \mod p.$$

It is possible to prove this by contradiction. If there were a probabilistic polynomial time bounded algorithm A for the client to forge an m and PMAC(x,t), one embodiment of the present invention can design an algorithm A' for the RSA problem as follows. Recall that the RSA problem is that, given p and integer e that is co-prime with $\phi(p)$, and an element $y \in \mathbb{Z}^*_p$, to find x such that $x^e = y \mod p$. A' can design a random oracle O like this, based on the assumption that $m \cdot g^{\psi}_k(t)$ is a random oracle. When A queries q messages $m_1, \ldots, m_q$ from it, O responds with PMAC(x, t)$^e$, where PMAC(x,t) is from the PMAC generator inside A', except for one random message $m_i$ where it responds with y of the RSA problem, and $e = \alpha^{-1} \mod \phi(p)$. Then A requests the PMAC of $m \in \{m_1, \ldots, m_q\}$ from A'. If $m \ne m_i$, A' responds with P M AC(x, t); otherwise, A' aborts. Now A can forge a PMAC x for some $m' \in \{m_1, \ldots, m_q\} - \{m\}$. With a probability of 1/q, $m' = m_i$, which solves the RSA problem because $x^e = y$. This contradicts the assumption that there is no probabilistic polynomial time bounded algorithm for the RSA problem.

Proof of Unforgeability of $\sigma$ Given Pre(q) and $g^{\Pi(x)r}$.

It is possible to prove this by contradiction. If there were a probabilistic polynomial time bounded algorithm A for the client to forge a $\sigma$ given pre(q) and $g^{\Pi(x)r}$, one embodiment of the present invention can design an algorithm A' for the RSA problem as follows. For problem $x^e = y \mod p$, A' simply asks A to forge $\sigma$ with pre(q)=e and $g^{\Pi(x)r}=y$.

Then $x=\sigma$, which solves the RSA problem. This contradicts the assumption that there is no probabilistic polynomial time bounded algorithm for the RSA problem. Combining both proofs, the present invention reaches the following theorem regarding the integrity of PMAC scheme.

Theorem 4.4:

A PPT client cannot forge a valid PMAC under chosen-plaintext attack.

Authenticating Spatio-Temporal Predicate

In this section, one embodiment of the present invention extends the location authentication scheme from a static spatial point to a spatio-temporal trajectory. Without loss of generality, let's assume a trajectory T consists of a series of pairs of user location and associated timestamp in ascending order of the timestamps. Formally, $$T=\{(x[1],t[1]),(x[2],t[2]),\ldots,(x[n],t[n])\}.$$

A spatio-temporal predicate (q, T) on a trajectory T returns true only if of all timestamps t[i] in the time interval T, all corresponding user locations x[i] are contained in window q. For ease of presentation, the rest of this section shall focus on a single dimension and the proposed scheme can naturally be extended to any dimensionality by treating each dimension independently.

To authenticate a spatio-temporal predicate, a naive approach is to apply the same spatial authentication scheme to each location within time interval T in the trajectory. The correctness of each timestamp t can also be verified because t contributes $\psi_k(t)$ to the PMAC and therefore the client sends plain text t to the verifier. However, to verify its completeness, that is, to prevent the client from omitting an existing location from a trajectory, the PMAC value at timestamp t must also depend on its two neighboring timestamps t[i−1] and t[i+1]. As such, one embodiment of the present invention redefines the $\psi_k$ (t) definition in PMAC (x,t) of Equation 1 as follows, $$\psi'_k(t[i])=-\psi_k(t[i-1])+2\psi_k(t[i])-\psi_k(t[i+1])),$$

where $\psi_k()$ is the original keyed pseudorandom function and $\psi_k()$ is the new function used in Equation 1. To avoid over-notating, in the following the specification still use $\psi_k()$ to denote the new function.

Therefore, given a spatio-temporal predicate (q, T), a baseline authentication scheme is as follows. The client first locates timestamps t[s], . . . , t[e] in T that fall in time interval T. For each location x[i] (s≤i≤e), it sends pre(x[i]), $\Pi$(su(x[i])), t[i] and P M AC(x[i], t[i]) to the verifier to compute and compare two versions of P M AC(x[i], t[i]). If they are the same, x[i] is inside window q. At the end of the day, the client also sends timestamps t[s−1] and t[e+1] to: (1) compute the PMACs of two boundary locations x[s] and x[e], and (2) prove that no location in T has been omitted.

However, the major disadvantage of this baseline approach is that both the computation and bandwidth costs are proportional to the number of locations being authenticated, and is thus inefficient when T is long. In the rest of this section, the present invention presents two indexing schemes that aim to authenticate them collectively. To start with, it is first present PMAC in an aggregated form.

Building Block: Aggregated PMAC

Similar to signature aggregation, MACs of different values can be aggregated into a single MAC value to save the bandwidth cost. There is a line of research in the literature of cryptography on MAC aggregation. As known in the art, a common approach to enable aggregation on a MAC scheme is to adopt the "XOR" operations. That is, for messages x[1], . . . , x[n]:

$$MAC(x[1], \square, x[n]) = \bigoplus_{i=1}^{n} MAC(x[i])$$

Unfortunately, this does not work for PMAC scheme, because besides P M AC(x[i]) and pre(x[i]), the verifier also needs $\sigma(i)=g^{\Pi(su(x[i]))r[i]} \mod p$ for verification, which cannot be aggregated by XOR in the same way as P M AC(x[i]). On the other hand, modular exponentiation satisfies an alternative property:

$$g^{\alpha[\sum_{i=1}^{n}(\Pi(x[i])r[i]+\psi_k(t[i]))]} = \left(\prod_{i=1}^{n} \sigma(i)\right)^{\alpha\Pi(pre(x))} \cdot g^{\alpha\sum_{i=1}^{n}\psi_k(t[i])} \mod p,$$

where pre(x) is the common prefix to verify for all x[i]. A key observation from this equation is that during verification the client can aggregate individual $\sigma(i)$ into a single one, and correspondingly the verifier only needs to verify an aggregate PMAC value of all x[i] as below:

$$PMAC(x,t)=g^{\alpha\sum_{i=1}^{n}\Pi(x[i])r[i]+\psi(t[i])} \mod p$$

The current invention calls PMAC(x, t) the PMAC of trajectory (x, t). Note that $$\sum_{i=1}^{n} \psi_k(t[i]) = -\psi_k(t[0]) + \psi_k(t[1]) + \psi_k(t[n]) - \psi_k(t[n+1]),$$

where t[0] and t[n+1] are the two timestamps adjacent to this trajectory.

Given a predicate (q, T), the verification procedure is as follows.

The client finds trajectory (x, t) that corresponds to (q, T).
The client computes $\sigma = g\Sigma_{i=1}^{n}(\Pi(su(x[i])r[i]))$ mod p and sends it together with PMAC(x, t), and timestamps t[0],t[1],t[n], and t[n+1].
The verifier computes $\sigma^{\alpha\Pi(pre(x))}$. $g^{\alpha((-\psi_k(t[0])+\psi_k(t[1])+\psi_k(t[n])-\psi_k(t[n+1])))}$ mod p and verifies if it matches the received PMAC(x, t).

From the above procedure, it is obvious that using a trajectory PMAC reduces the bandwidth cost from n to 1.

It is noteworthy that the above aggregate PMAC can be generated by the client itself by multiplying individual PMAC(x[i], t[i]) as follows.

$$PMAC(x, t) = \prod_{i=1}^{n} PMAC(x[i], t[i]) \bmod p$$

This is an essential requirement because trajectory (x, t) depends on the predicate (q, T), which is unknown to the authenticator in advance.

B. PMAC Indexing

Aggregated PMAC reduces the communication cost when authenticating a set of locations. However, the computational cost, in terms of modular exponentiations on both sides, is still proportional to the size of the set, and hence can be inefficient when T is long. Based on aggregated PMAC, the current invention proposes two PMAC indexes that precompute and store aggregate PMACs in advance for future authentication. Note that both indexes take the form of a general (possibly unbalanced) search tree, because mobile device storage is less I/O bounded than desktop computers.

Figure 3:
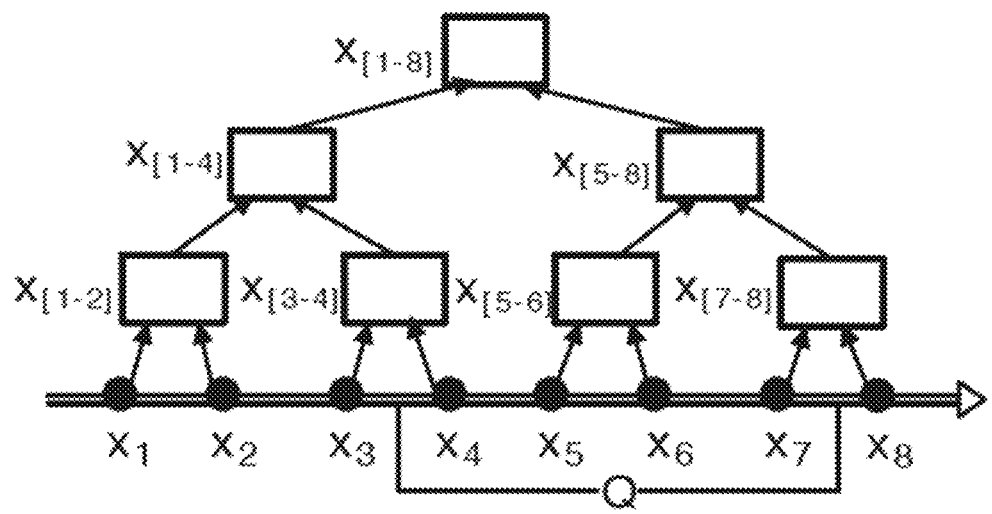
FIG. 3 shows the PS-Tree: PMAC Search Tree.

PS-Tree: PMAC Search Tree:

The first index treats time as a special dimension, and organizes all locations in a k-way search tree. FIG. 3 illustrates a binary search tree, where each intermediate node stores the aggregated PMAC of all its descendants. Specifically, each leaf node represents a location with a timestamp, and is threaded with adjacent leaf nodes. Each intermediate node consists of four pieces of information about its descendants: (1) their longest common prefix pre(x), (2) their accumulative suffix $g^{\Sigma_{i=1}^{n}\Pi(su(x[i]))r[i]}$ mod p, (3) the timestamps of t[0],t[1],t[n], and t[n+1], and (4) their aggregated PMAC. Since all the information can be computed by the client, the construction of this index can be constructed by the client in a bottom-up manner without the authenticator.

Given a predicate (q, T), the verification procedure is as follows, illustrated in FIG. 3.

Starting from the root of the index, the client recursively checks whether the timestamps of this node are fully contained in T. If so, there is no disclosure of any location information beyond T and therefore this node can be used for authentication; otherwise, all child nodes whose timestamps overlap with T will be checked instead. The procedure terminates when no more nodes need to be checked and this leads to a minimum set of mutually exclusive nodes that jointly cover T. In this example, these nodes are $x_4$, $x_{[5-6]}$, and $x_7$. The aggregated PMACs of these nodes will be used to authenticate against q in the next step.

For each node above, the client authenticates that q is a prefix of this node's pre(x), by computing the following σ:

$$\sigma = \prod_{i=1}^{n}(g^{\Pi(su(x[i]))r[i]}) \prod_{j=d'+1}^{d}(x[j]\cdot j, j)$$

where d' and d are the length of q and pre(x), respectively, and Π(x[i].j, j) is the mapped prime number of j-th character of location string x[i]. The client sends σ together with the PMAC value, and timestamps t[0], t[1], t[n], and t[n+1] of this node.

For each received σ, the verifier computes $$\sigma^{\alpha\Pi(q)} \cdot g^{\alpha(-\psi_k(t[0])+\psi_k(t[1])+\psi_k(t[n])-\psi_k(t[n+1]))} \bmod p$$

and verifies if it matches the received PMAC value.

By verifying t[n+1] of the i-th node is equivalent to t[0] of the i+1-th node in the above authentication, and by verifying t[0] of the first node and t[n+1] of the last node (in this example, $t_3$ and $t_8$) are beyond T, the verifier can guarantee no location falling in T is missing from authentication.

PS*-Tree: PMAC Clustered Search Tree:

While preserving the temporal locality, a PS-tree does not consider the spatial locality. As a consequence, the current invention cannot exploit the spatial predicate q to reduce the number of nodes to authenticate. For example, in FIG. 3, if q is a prefix of the root node's pre(x), authenticating it alone suffices for authenticating the entire spatiotemporal predicate (q, T). However, there are two challenges to enable such pruning. First, showing the entire trajectory from $t_1$ to $t_8$ falling in q discloses more information to the verifier than he/she is supposed to know, which should only be that locations from $t_4$ to $t_7$ fall in q, and that all other timestamps are beyond T. Second, to reduce the number of nodes to authenticate, locations in a node should share as long prefix as possible so that q can be authenticated by upper-level nodes. As such, an algorithm that clusters spatial locations while still retaining their temporal order in the trajectory should be devised. In what follows, we propose a second PMAC index—PS*-tree—that addresses these two challenges.

Figure 4:
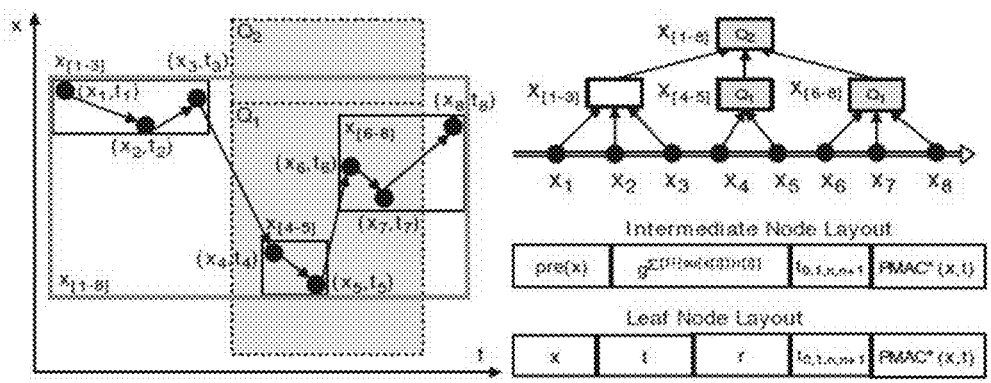
FIG. 4 shows the PS*-Tree: PMAC Clustered Search Tree.

FIG. 4 illustrates this index with the same user trajectory and predicate as in FIG. 3. The horizontal and vertical axes denote the temporal and 1D spatial dimension, respectively. Same with the threaded search tree, each leaf node in the PS*-tree represents a location with a timestamp and the intermediate node also consists of four pieces of information about its descendants. The major difference lies in the definition of aggregated PMAC, where the current invention replaces $\psi_k(t)$ with $\psi_k(t)$ and call it PMAC*:

$$PMAC^*(x,t) = g^{\alpha\Sigma_{i=1}^{n}[\Pi(x[i])r[i]+\psi_k(t[i])]} \bmod p, \quad (3)$$

where $$\psi_k(t) = \psi_k(G(t-t_L)|G(t_U-t)|h(t)), \quad (4)$$

where h(t) is a cryptographic hashing function, L and U are the lower and upper bounds of timestamps, and G(t) is a digest function that satisfies the following properties.

non-negative: The input domain of G( ) only accepts non-negative numbers.
addictively homomorphic: That is, $$G(a+b)=G(a) \otimes G(b),$$

where $\otimes$ is a well-defined operation on G.

By introducing G in the aggregated PMAC, the client can prove to the verifier that a time interval T=[T.l, T.u] is fully contained in the time interval of a node without disclosing the actual interval to the verifier. To prove T.u≤t[n], the client sends G(t[n]−T.u) to the verifier, who then restores G(t[n]−L)=G(t[n]−T.u) $\otimes$ G(T.u−L). By computing the PMAC* value in Equation 3 and matching it with the one directly from the client, the verifier can assure T.u≤t[n]. Similarly, the same construct can be used to prove T.l≥t[1].

Given a predicate (q, T), the verification procedure on PS*-tree is as follows.

Starting from the root node, the client recursively checks whether q is a prefix of this node's pre(x). If so, the PMAC* value of this node will be authenticated; otherwise, all child nodes whose timestamps overlap with T will be checked instead. This procedure terminates when no more node needs to be checked. In FIG. 4, for predicate Q1=(q1, T), since q1 is not a prefix of x[1-8]'s pre(x), the PMAC* values of x[4-5] and x[6-8] will be authenticated; for Q2=(q2, T), since q2 is a prefix of x[1-8]'s pre(x), the PMAC* value of x[1-8] will be authenticated. In either case, the number of nodes to be authenticated is reduced from 3 in the case of PS-tree.

For each node above, the client authenticates that q is a prefix of this node's pre(x), by computing the same σ as in PS-tree authentication:

$$\sigma = \prod_{i=1}^{n} (g^{\Pi(su(x[i]))r[i]}) \prod_{j=d'+1}^{d} (x[j] \cdot j, j)$$

The client sends σ together with the PMAC value, and timestamps t[0], t[1], t[n], and t[n+1] of this node. Note that, if any of these timestamps is beyond the time interval T, to protect them the client sends digest value G and h( ) of these timestamps instead. Specifically, if t>T.u, the client sends G(t−T.u), G(U−t) and h(t); if t<T.l, the clients sends G(T.l−t), G(t−L) and h(t).

For each received σ, the verifier first restores ψ(t) using Equation 4 for t=t[0], t[1], t[n] and t[n−1], then computes $$\sigma^{\alpha\Pi(q)} \cdot g^{\alpha(-\psi k(t[0])+\psi k(t[1])+\psi k(t[n])-\psi k(t[n+1]))mod} p$$

and verifies if it matches the received PMAC value. Note that by successfully verifying the PMAC* values of all nodes whose timestamps overlap with T, the verifier can guarantee no location falling in T is missing from authentication.

To build a k-way PS*-tree out of a trajectory, and to cluster spatial locations while still retaining their temporal order, we propose a greedy bottom-up merging algorithm as follows. The client repeatedly merges k adjacent nodes which share the longest prefix; and the process terminates when there are k or fewer than k nodes, which are merged into the root node. Note that to enable the client to compute the aggregated PMAC* value of a node from its child nodes, the authenticator should generate and store PMAC* value of each leaf node.

Performance Optimizations

In this section, one embodiment of the present invention proposes two optimization techniques that further reduce the computational cost of the proposed scheme.

Accelerating PMAC Verification

According to Euler's theorem: for modulus p and g p that are co-prime to p. Applying this theorem, the client can reduce the cost of computing $\sigma = g^{\Pi(su(x))r} \mod p$ by $$g^{\Pi(su(x))r} \mod p = g^{\Pi(su(x))r \mod \phi(p)} \mod p$$

Similarly, the verifier can reduce the cost of computing PMAC by applying mod φ(p) on the exponents:

$$(\sigma^{\Pi(pre(x))mod \phi(p)} g^{\psi k(t)})^{\alpha \mod \phi(p)} \mod p$$

Note that since in practice p is the product of two large primes, disclosing φ(p) to the client may cause security implications if p is not properly chosen. As such, in the presently proposed implementation, only the verifier learns φ(p) and can accelerate its computation.

Density-Based Spatial Recoding

In previous sections, the present invention adopts a hierarchical regular grid as the space encoding scheme. The disadvantage of using a regular grid, however, is that every user location has to be encoded in a full-length string. In fact, for a given alphabet of c characters and string length of m, there can be totally cm combinations, much larger than the total number of user locations collected in a long period of time. As such, if we map distinct user locations to each of these combinations, the string length m can be greatly reduced. In this optimization, one embodiment of the present invention proposes density-based spatial recoding that uses an auxiliary index to translate a user location in a full-length string to an "acronym" with shorter length, which can reduce the computational cost of generating and verifying PMACs.

Figure 5:
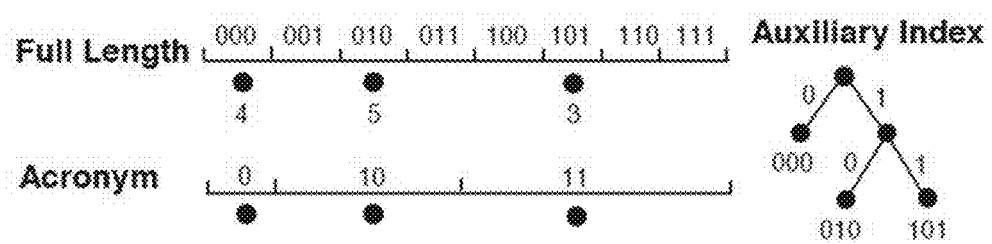
FIG. 5 shows the Density-Based Recoding.

FIG. 5 illustrates the idea of density-based recoding and the auxiliary index for c=2. The present embodiment assumes for privacy protection, the client only recodes the first r=3 characters. In the figure, all 12 user locations are clustered in three full-length prefixes: "000", "010" and "101", which may correspond to his/her neighborhood and workplaces. The digits "4", "5" and "3" denote the occurrences of user locations in each of these prefixes. As the objective of recoding is to minimize the average string length of user locations, this is similar to Huffman coding that minimizes the average string length of a set of symbols, except that to enable authentication, the proposed recoding must also preserve the original order of the recoded strings. It is noteworthy that the greedy Huffman coding algorithm achieves the minimum string length while for this order-preserving variant, an optimal solution can only be achieved by dynamic programming, which is extremely costly given the size of the prefixes. In this regard, an embodiment of the present invention proposes the following order-preserving Huffman coding algorithm. Instead of merging any c symbols that have the minimum sum of occurrences, the algorithm merges the c consecutive symbols that have the minimum sum. In this figure, "000" "010" and "010" "101" serve as the only two sets of consecutive symbols, and the latter has the minimum sum. As such, "010" "101" will be merged first and then be merged with "000". The resulted auxiliary index is shown on the right hand side. The verifier will receive this index before the first verification request and recode a predicate into the same form of acronym. Then all PMAC generation and verification will be conducted in the recoded string space.

In one example, a remaining problem is how the verifier can authenticate the auxiliary index itself. In the literature, there are a wide range of authentication data structures for trees, in particular, the family of Merkel Hash Tree. Specifically, each node will be accompanied with a digest: a leaf node digest is the hash value of its contents (in the present invention's auxiliary index they are the prefix string such as "010"); and an intermediate node digest is the hash value of its children digests and its contents (in the present invention's auxiliary index they are empty). As such, the digest of the root node depends on the entire tree and can be signed by the authenticator when the auxiliary index is constructed.

Performance Evaluation

In this section, there is presented an example of an evaluation of the experimental results of the proposed PMAC scheme and spatio-temporal authentication protocols. To test the performance in a real-life setting, in this example, dataset "GeoLife GPS Trajectories" from Microsoft Research is used. This dataset collected 182 users of their 17,621 GPS trajectories (latitude, longitude, altitude, timestamp) from April 2007 to August 2012. Firstly, the test filters out those trajectories whose number of locations is fewer than 990 and convert all longitude, latitude and timestamps into 32-bit binaries. For each resulted 2D trajectory, the test builds both a 2-way P S-tree and a P S*-tree on its PMACs. The code of both client and verifier is implemented in Java. The client is set up on a Google Nexus 10 tablet with 1.7 GHz dual-core ARM Cortex-A15 processor and 2 GB RAM, running Android 4.3, and the verifier is set up on an IBM server with Dual 6-core Intel Xeon X5650 2.66 GHz CPU and 32 GB RAM, running GNU/Linux and OpenJDK 1.6 64 bit. The hash function h( ) is 160-bit SHA-1, and to enable high security, the present embodiment sets all security parameters in our scheme, including the modulus p, $\alpha$, r, and g as 1024-bit. The pseudo random function $\psi_k$( ) adopts AES-256. The present embodiment uses the digest function G( ) with the base of the canonical representation set to 2. By default, the authentication algorithms adopt both optimizations proposed in the earlier section. For performance evaluation, the present embodiment measure the computational cost (in terms of the client and verifier's CPU time) for authentication, and the communication overhead (in terms of the transmitted data size). The bit length of spatial predicates ranges in from 16 to 32, and the bit length of timestamps range from 2 to 8. For each measurement, 500 spatio-temporal predicates are authenticated and their average value is reported. Table I summarizes the parameter settings used in the experiments.

TABLE I

PARAMETER SETTINGS FOR EXPERIMENTS

| Parameter | Symbol | Value |
|---|---|---|
| total trajectories | N | 5881 |
| average trajectory length | $\mathcal{T}$ | 3463 |
| spatial predicate bit length | q | [16, 32] |
| temporal interval bit length | T | [2, 8] |
| additional grids | $\tau$ | 16 |

Overall PMAC Generation and Authentication Performance

In this subsection, one embodiment of the present invention evaluates the overall performance of PMAC generation, PS-tree and PS*-tree construction and authentication. Table II shows the CPU time and size of PMAC, PS-tree, and PS*-tree, of three sample trajectories with different length T. The embodiment observes that both metrics of the PS-tree and PS*-tree increase in proportion to the length of the trajectory. Note that theoretically a PS*-tree has the same size of a PS-tree, but to speed up subsequent computation on the G( ) during verification, the embodiment pre-computes and stores the canonical form of G( ). Therefore, in this table a PS*-tree is about 4 times larger than a PS-tree. In terms of the CPU cost, both PMAC and PS-tree are efficient to compute, whereas PS*-tree takes about twice the time of PMAC, but still fewer than 20 minutes even for the longest trajectory (whose temporal interval is over 2,000 minutes).

TABLE II

PMAC AND INDEX CONSTRUCTION COST

| | CPU Time (s) | | | Size (MB) | | |
|---|---|---|---|---|---|---|
| T = | PMAC | PS-tree | PS*-tree | PMAC | PS-tree | PS*-tree |
| 993 | 9.6 | 1.9 | 18 | 0.35 | 1.2 | 5.4 |
| 10019 | 86.7 | 14.6 | 158 | 3.4 | 11.6 | 54 |
| 92645 | 815 | 141.5 | 1194 | 32 | 110 | 512 |

Figure 6:
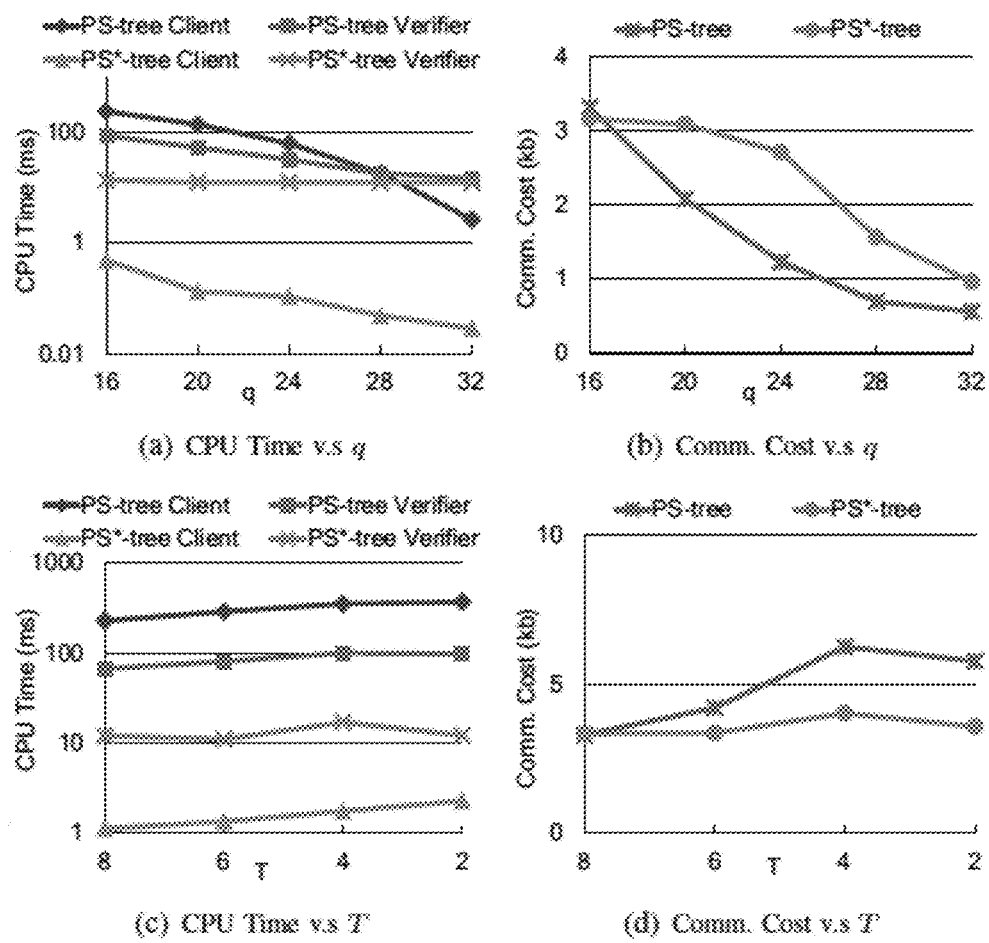
FIG. 6 shows the authentication Performance on PS- and PS*-trees.

To evaluate the authentication cost of a spatio-temporal predicate, the embodiment first varies the spatial predicate bit length q from 16 to 32. FIGS. 6(a) and 6(b) plot the CPU and communication costs with respect to q. In all cases, as q increases (i.e., the spatial predicate gets smaller), the costs are reduced because the authentication can terminate in higher-level nodes in the tree. PS*-tree is up to 2-orders of magnitude more efficient than PS-tree in terms of CPU cost, because it can terminate in even-higher-level nodes, thanks to the G function and the clustering effect. However, it is at the cost of larger communication size, due to the additional canonical form of G being sent. This embodiment then varies T from 8 to 2. FIGS. 6(c) and 6(d) plot the CPU and communication costs with respect to T. As T decreases, the temporal interval of the predicate becomes longer, and therefore all verification costs increase. Nonetheless, in terms of both CPU time, PS*-tree outperforms PS-tree by at least one-order of magnitude, and it also costs less communication than PS-tree. This demonstrates that the PS*-tree is insensitive to the temporal interval of a spatio-temporal predicate and performs exceptionally well when this interval is long. The rationale is that, as the temporal interval increases, the corresponding spatial predicate must also have a shorter prefix, and therefore negates the factor of a longer temporal interval spanning more tree nodes.

Effect of Relative Authentication Performance

Figure 7:
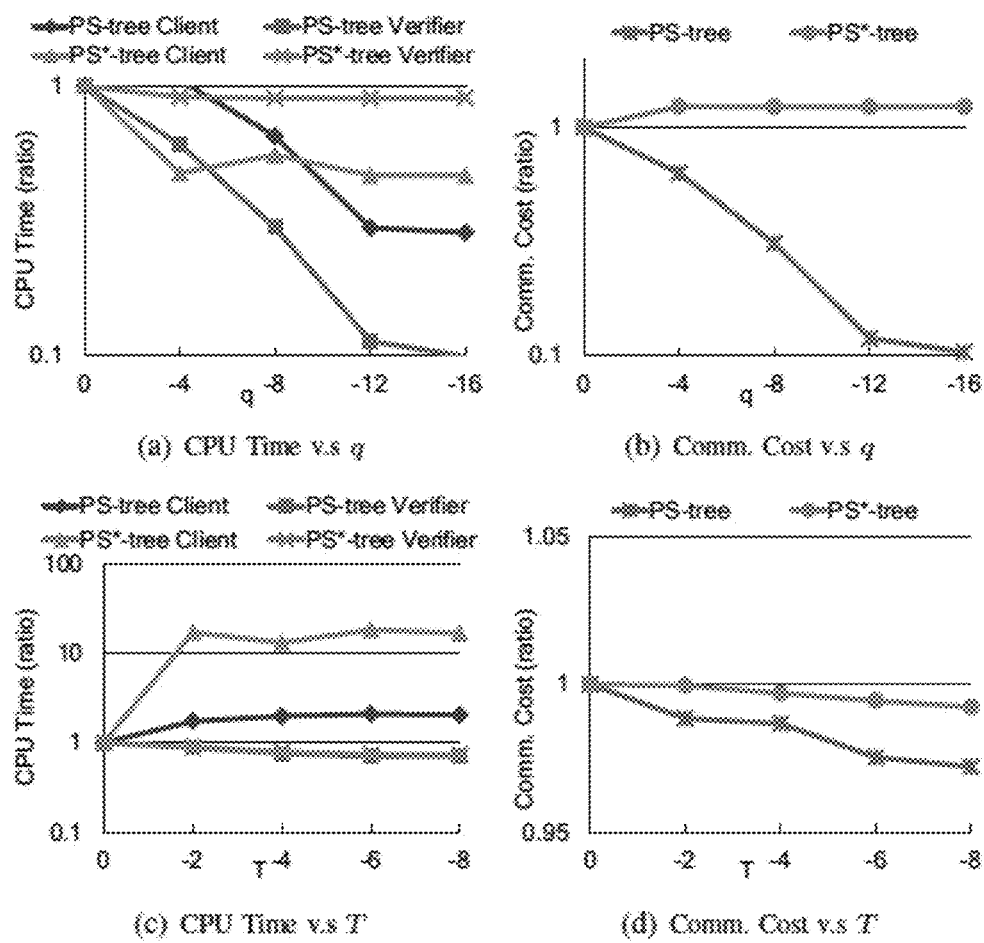
FIG. 7 shows the Relative Authentication Performance on PS- and PS*-tree.

In the above experiments, each measurement is averaged by a variety of spatio-temporal predicates and thus can be influenced by the location distribution in the trajectories. To show how PS-tree and PS*-tree behave when a verifier enlarges or reduces a given predicate, in this subsection one embodiment of the present invention creates a variety of minimum viable predicates (MVPs), which have the smallest spatial size q given a temporal interval T or vice versa, according to the tightest bound of a trajectory. This embodiment then create other predicates by increasing q or decreasing T of these MVPs. FIG. 7 shows the relative performance for these predicates with respect to their MVPs, with measurements for MVPs set as base. As such, the leftmost position in the x-axis denotes the measurement for MVPs and always has value 1. In FIGS. 7(a) and 7(b), each position reduces the bit length of q by 4 bits, so the size of the predicate becomes 16 times larger in each dimension. In general, as q decreases, the performance improves as the authentication can terminate at higher-level of nodes for both PS-tree and PS*-tree. PS-tree has an even sharper drop of the costs, which means that it is more sensitive to the spatial size of the predicate while PS*-tree already achieves satisfactory performance for the MVPs and thus further improvement is less noticeable. Similar observation can be made in FIGS. 7(c) and 7(d), where each position reduces the bit length of T by 2 bits and effectively shrinks the temporal interval by ¼. PS*-tree leads to worse performance than PS-tree as shorter T favors the latter more. To conclude, with reasonably higher construction and storage cost, a PS*-tree achieves better performance than a PS-tree, especially when the temporal interval is long or the spatial predicate is small.

Effect of Optimizations

Figure 8:
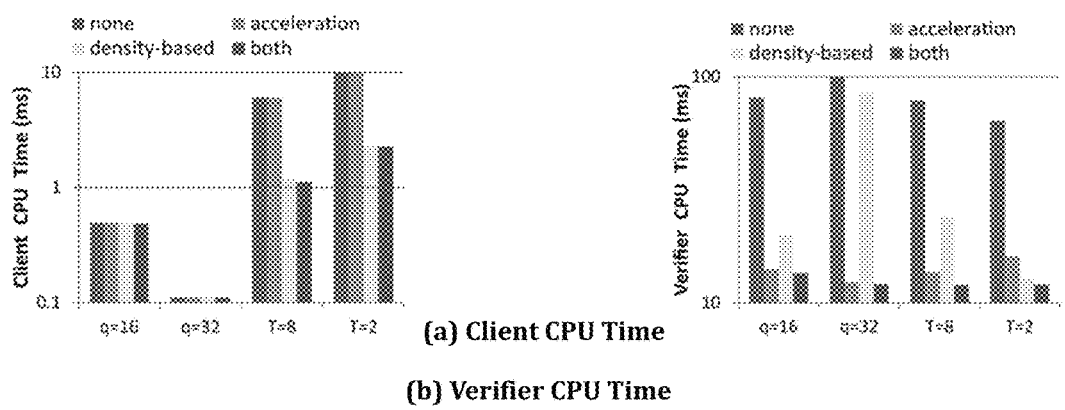
FIG. 8 shows the Effect of Optimizations.

In this subsection, the present embodiment evaluates the effect of the two schemes, namely, PMAC accelerating and density-based spatial recoding introduced in in an earlier section. The present embodiment chooses four settings for predicates: q=16, q=32, T=8 and T=2, and plot the client and verifier's CPU time on PS*-tree in FIG. 8. Note that for a tight security model, we disable client-side PMAC accelerating, so it has no effect on client's CPU time. Other than that, both optimizations achieve significant performance enhancement over the original scheme, by factors ranging from 2 to 8. In particular, by adopting both optimizations, the verifier's CPU time can be reduced by almost an order of magnitude.

In this invention, the problem of integrity assurance which discloses to the verifier no more information beyond the spatio-temporal predicate itself was solved. One example of the solution is based on prefix-verifiable MAC (PMAC), a cryptographic construct designed by us to verify the integrity of any prefix of a string. The present invention then presented authentication protocols for both spatial and spatio-temporal predicates. Two indexing schemes for PMACs were proposed to pre-aggregate sub-trajectories and accelerate the verification process. The present invention further proposed two optimization techniques to reduce the computational and communication costs. The proposed security analysis and experimental results show that this authentication scheme is both secure and efficient for practical use.

Figure 9:
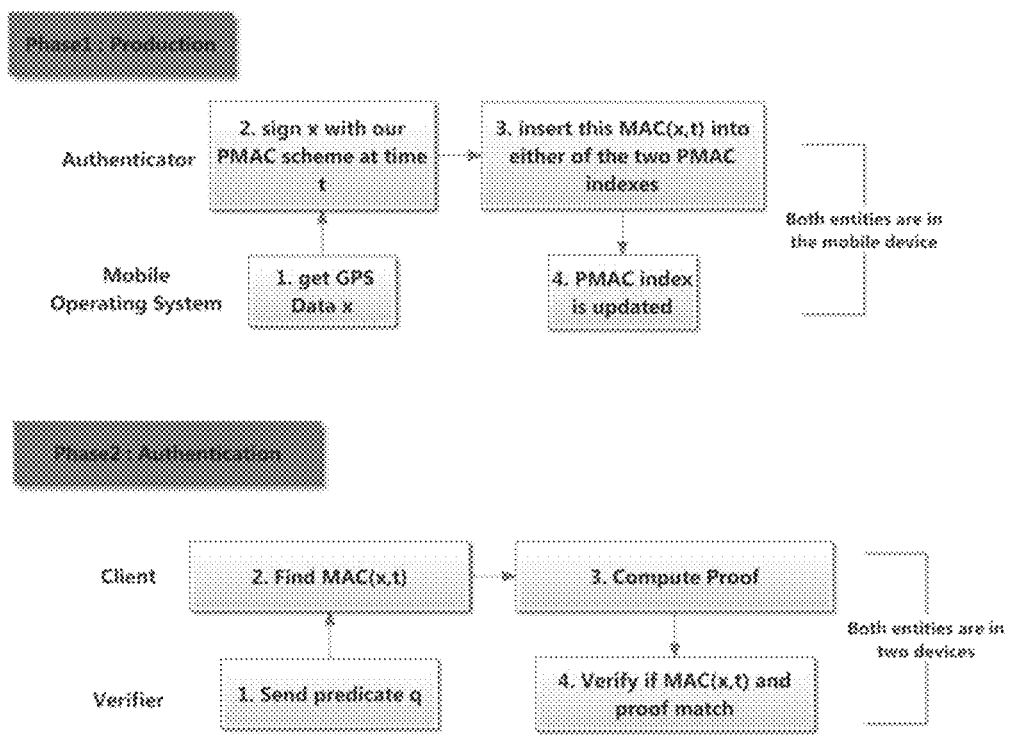
FIG. 9 shows an implementation of the present invention.

For clarity, FIG. 9 shows one implementation of an embodiment of the present invention wherein the embodiment is implemented in two phases. In Phase 1: Production—which is the generation of a MAC(x) using the proposed PMAC scheme based on the GPS Data x. The MAC(x) is then inserted into one of the PMAC indexes and the PMAX index is updated. All these operations are done in the mobile devices. In Phase 2: Authentication—wherein the authentication phase of the present invention is performed. For this phase, this process happens across two devices, one being the client while the other is the verifier. At the verifier, the spatial predicted q is sent to the client while the client also finds the associated MAC(x, t). The client then compute the proof based on the MAC(x, t) and send this proof to the verifier which further authenticate the client by verifying the spatial predicted q associated MAC (x, t) with the computed proof from the client.

INDUSTRIAL APPLICABILITY

The present invention relates to method and apparatus of an location assurance system and particularly, although not exclusively, the present invention also relates to method and apparatus for assuring location data integrity with minimum location disclosure. The present invention also relates to method and apparatus for assuring location data integrity with minimum location disclosure with protocols to authenticate both spatial and spatio-temporal predicates.

If desired, the different functions discussed herein may be performed in a different order and/or concurrently with each other. Furthermore, if desired, one or more of the above-described functions may be optional or may be combined.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the reminder of the disclosure in any way whatsoever. Without further elaboration, it is believed that one skilled in the art can, based on the description herein, utilize the present invention to its fullest extent. All publications recited herein are hereby incorporated by reference in their entirety.

What we claim:

1. A method for assuring location data integrity with minimum location disclosure comprising steps of:
    using Prefix-verifiable Message Authentication Codes (PMAC) to assure the integrity of the location data exchanged between a client device executing an authenticator and a verifier, wherein under the PMAC scheme, a variable-length prefix of the location data and a one-way-irreversible transformation of a corresponding suffix of the location data are presented to the verifier to allow the verifier to compute a result for comparing a received PMAC to verify the received prefix without compromising confidentiality of the suffix;
    using the PMAC from the previous step to authenticate/verify for spatial and spatio-temporal predicates; and
    using one or more message authentication codes indexes and one or more optimization techniques to reduce computation and communication costs;
    wherein the PMAC is generated via steps comprising:
        generating a symmetric key and securely sharing this symmetric key between the authenticator and the verifier;
        generating a random value of r;

generating a PMAC value of the location data string x at timestamp t with respect to the symmetric key generated in the first step; and storing at least one tuple of (r, PMAC(x, t)) together with the location data string x and timestamp t on the client device executing the authenticator for authentication/verification.

2. The method according to claim 1, wherein the PMAC is authenticated/verified via steps comprising:

for any given prefix of the location data string x, pre(x), the authenticator obtains a suffix of the string x, su(x), computes $\sigma = g^{\Pi(su(x))r}$ mod p, and sends the results together with t and PMAC(x, t) to the verifier;

the verifier computes $(\sigma^{\Pi(pre(x))} g^{\psi_k(t)})^\alpha = g^{\alpha(\Pi(x)r + \psi_k(t))}$ mod p; and the verifier compares the computed result with the received PMAC(x, t) to verify the given prefix pre(x).

3. The method according to claim 1, wherein the authentication for spatial predicates are done via steps comprising:

authenticating/verifying a containment of spatial predicate of q on x in the same manner as to verifying given prefix pre(x) according to claim 2 in each dimension using PMAC.

4. The method according to claim 3, wherein the containment of spatial predicate of q on x are implemented via a hierarchical grid scheme wherein the grid scheme imposes limitations comprising:

on the containment of spatial predicate of q in one or more dimensions, the beginning and ending positions of q, denoted by q.l and q.u wherein each must share the same prefix and have the same number of '0's and '1's in their suffix, respectively.

5. The method according to claim 4, wherein the hierarchical grid scheme is an overlayed grid system wherein q.l and q.u are encoded in different grids.

6. The method according to claim 4, wherein for a given containment of spatial predicate of q and a set of grids, the encoding and authentication q in each dimension is done via operation steps comprising:

for each trie of a grid, first locate q.l;

then traverse upward until the label on the edge is no longer '0' or the label on the edge is no longer the first character in the alphabet then the corresponding subtree is q'.l, and it is valid if the length is no shorter than that of q;

similarly, the same operation steps are done to find q'.u for the same trie.

7. The method according to claim 1, wherein the authentication/verification for spatial-temporal predicates are done via steps comprising:

for a given a spatio-temporal predicate (q, T), a client device executing the authenticator first locates timestamps t[s], . . . , t[e] in T that fall in time interval T;

for each location data string x[i] (s≤i≤e), said client device sends pre(x[i]), Π(su(x[i])), t[i] and PMAC(x[i], t[i]) to the at least one verifier to compute and compare two versions of PMAC(x[i], t[i]);

if the two versions of PMAC(x[i], t[i]) are the same, x[i] is inside q.

8. The method according to claim 1, wherein Aggregated PMAC is used in place of PMAC.

9. The method according to claim 1, wherein PMAC Search Tree is used as one of the indexing technique to reduce computation and communication costs.

10. The method according to claim 1, wherein PMAC Clustered Search Tree is used as one of the indexing technique to reduce computation and communication costs.

11. The method according to claim 1, wherein density-based spatial recoding is used as one of the optimization technique to reduce computation and communication costs.

12. The method according to claim 1, wherein accelerate PMAC verification is used as one of the optimization technique to reduce computation and communication costs.

13. An apparatus for assuring location data integrity with minimum location disclosure comprising:

a computing processor configured to generate and process Prefix-verifiable Message Authentication Codes (PMAC) to assure the integrity of location data between an authenticator computing device and a verifier computing device, wherein under the PMAC scheme, a variable-length prefix of the location data and a one-way-irreversible transformation of a corresponding suffix of the location data are presented to the verifier computing device to allow the verifier computing device to compute a result for comparing a received PMAC to verify the received prefix without compromising confidentiality of the suffix;

the computing processor is further configured to use the PMAC from the previous step to authenticate/verify for spatial and spatio-temporal predicates; and the computing processor is further configured to use one or more message authentication codes indexes and one or more optimization techniques to reduce computation and communication costs;

wherein the PMAC is generated via steps comprising:

generating a symmetric key and securely sharing this symmetric key between the authenticator computing device and the verifier computing device;

generating a random value of r;

generating a PMAC value of the location data string x at timestamp t with respect to the symmetric key generated in the first step; and storing in a database at least one tuple of (r, PMAC(x, t)) together with the location data string x and timestamp t on the authenticator computing device for authentication/verification.

14. The apparatus according to claim 13, wherein the PMAC is authenticated/verified via steps comprising:

for any given prefix of the location data string x, pre(x), the authenticator computing device obtains a suffix of the string x, su(x), computes $\sigma = g^{\Pi(su(x))r}$ mod p, and sends the results together with t and PMAC(x, t) to the verifier computing device;

the at least one verifier computing device computes $(\sigma^{\Pi(pre(x))} g^{\psi_k(t)})^\alpha = g^{\alpha(\Pi(x)r + \psi_k(t))}$ mod p; and the verifier computing device compares the computed result with the received PMAC(x, t) to verify the given prefix pre(x).

15. The apparatus according to claim 13, wherein the authentication for spatial predicates are done via steps comprising:

authenticating/verifying a containment of spatial predicate of q on x in the same manner as to verifying given prefix pre(x) according to claim 14 in each dimension using PMAC.

16. The apparatus according to claim 15, wherein the containment of spatial predicate of q on x are implemented via a hierarchical grid scheme wherein the grid scheme imposes limitations comprising:

on the containment of spatial predicate of q in one or more dimensions, the beginning and ending positions of q, denoted by q.l and q.u wherein each must share the same prefix and have the same number of '0's and '1's in their suffix, respectively.

17. The apparatus according to claim 16, wherein the hierarchical grid scheme is an overlayed grid system wherein q.l and q.u are encoded in different grids.

18. The apparatus according to claim 13, wherein Aggregated PMAC is used in place of PMAC and/or PMAC Search Tree and/or PMAC Clustered Search Tree is used as one or more of the indexing techniques and/or density-based spatial recoding and/or accelerate PMAC verification is used as one or more of the optimization techniques.

* * * * *